(12) United States Patent  
Stockard et al.

(10) Patent No.: US 8,991,901 B2  
(45) Date of Patent: Mar. 31, 2015

(54) ENERGY ABSORBER DEVICE FOR A VEHICLE AND METHOD OF MANUFACTURING SAME

(71) Applicant: GM Global Technology Operations LLC, Detroit, MI (US)

(72) Inventors: Michael L. Stockard, Oxford, MI (US); Ciprian C. Robu, Utica, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/961,943

(22) Filed: Aug. 8, 2013

(65) Prior Publication Data

US 2014/0333091 A1    Nov. 13, 2014

Related U.S. Application Data

(60) Provisional application No. 61/820,296, filed on May 7, 2013.

(51) Int. Cl.  
*B60R 19/34* (2006.01)

(52) U.S. Cl.  
CPC .................................. *B60R 19/34* (2013.01)  
USPC ................................ 296/187.03; 296/187.09

(58) Field of Classification Search  
CPC .............. B62D 21/15; B62D 21/152; B60R 2019/186; B60R 2019/188; B60R 2021/0414  
USPC .......... 296/187.03, 37.12, 187.09; 228/112.1; 293/155, 132, 133  
See application file for complete search history.

(56) References Cited

U.S. PATENT DOCUMENTS 3,036,793 A  *  5/1962  Becker ....................... 242/118.6  
7,871,122 B2 *  1/2011  Salomonsson ........... 296/187.03

* cited by examiner

*Primary Examiner* — Joseph D Pape  
*Assistant Examiner* — Dana Ivey  
(74) *Attorney, Agent, or Firm* — Quinn Law Group, PLLC

(57) ABSTRACT

An energy-absorber device is mountable to a component of a vehicle, such as an engine cradle. The energy absorber device includes an elongated first member and an elongated second member. The first member has a first pair of aligned apertures at least partially defined by and extending through first and second side walls of the first member. The second member has a second pair of aligned apertures at least partially defined by and extending through first and second side walls of the second member. The first member is attached to the second member with the side walls of the first member at least partially overlapping the side walls of the second member, with a base of the first member positioned opposite a base of the second member. Aligned pairs of apertures function as deformation initiation features when a predetermined force in a longitudinal direction is applied to the first ends.

14 Claims, 5 Drawing Sheets

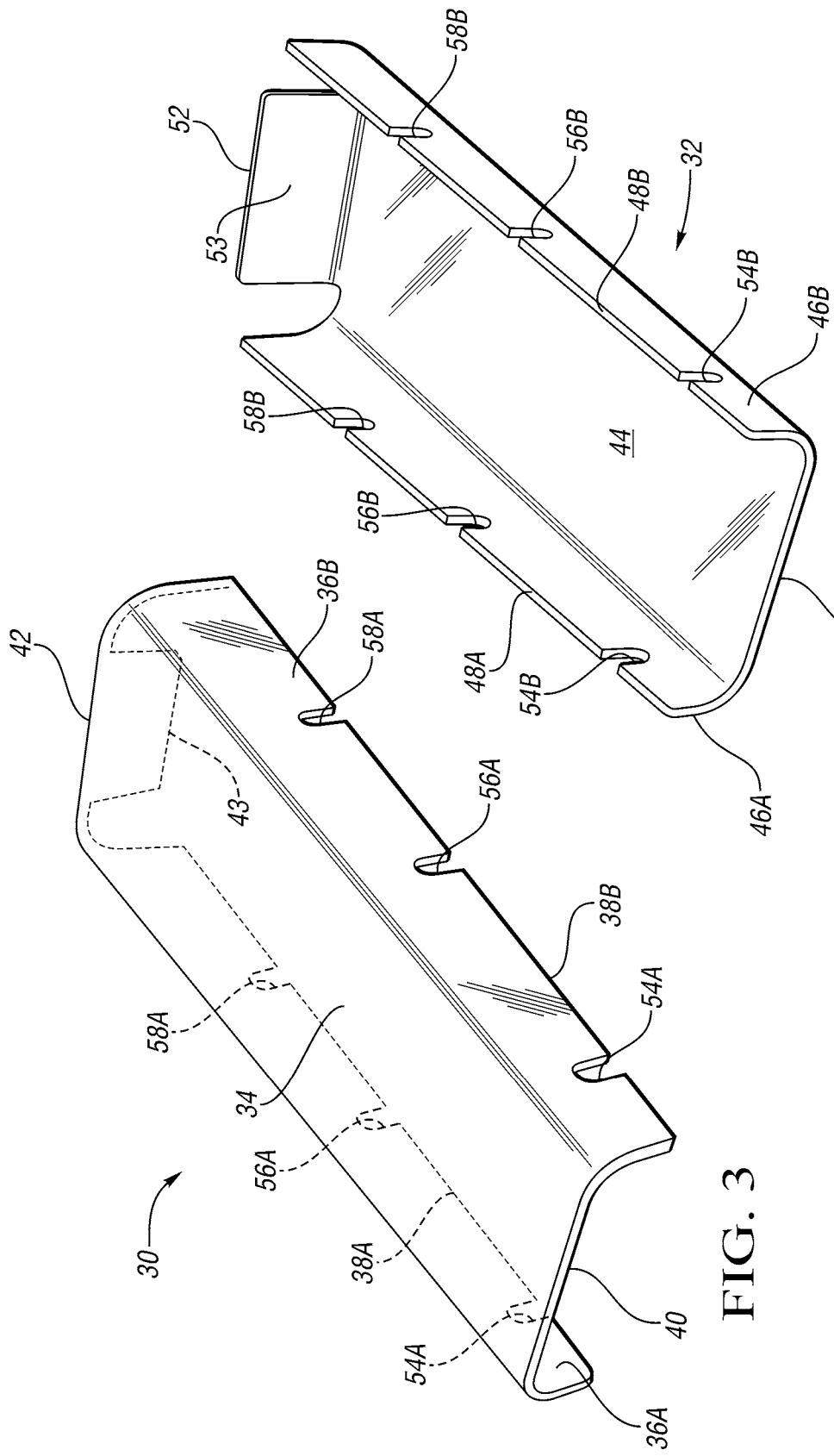

US 8,991,901 B2

ENERGY ABSORBER DEVICE FOR A VEHICLE AND METHOD OF MANUFACTURING SAME

CROSS-REFERENCE TO RELATED APPLICATION

This application claims priority to U.S. Provisional Application 61/820,296, filed May 7, 2013.

TECHNICAL FIELD

The present teachings generally include an energy absorber device which can be an extension of a front engine cradle of a vehicle.

BACKGROUND

Automotive vehicles are typically designed to absorb and manage applied forces. For example, a vehicle bumper is designed to absorb a significant amount of energy from an external force to limit possible deformation of surrounding components.

SUMMARY

An energy absorber device is attachable to a component of a vehicle, and has at least one member with a series of spaced apertures that are spaced between a first end and a second end of the member. The spaced apertures are configured to establish a predetermined deformation progression as the device absorbs the energy of a force applied at the first end.

More specifically, an energy-absorber device is mountable to a component of a vehicle, such as a front engine cradle. The energy absorber device includes an elongated first member and an elongated second member. Each of the first member and the second member has a base with a first end and a second end, and has opposing first and second side walls extending from the base between the first end and the second end. The first member has a first pair of apertures at least partially defined by and extending through the first and second side walls of the first member. The second member has a second pair of apertures at least partially defined by and extending through the first and second side walls of the second member. The first member is attached to the second member with the side walls of the first member at least partially overlapping the side walls of the second member, and the first base and the second base positioned opposite one another. In this arrangement, a cavity is formed between the attached members, and the first pair of apertures is at least partially aligned with the second pair of apertures. As used herein, apertures are "aligned" with one another when they are positioned at substantially the same lateral location along the length of the device. In some but not all embodiments, the apertures overlap one another when they are laterally aligned.

The aligned pairs of apertures are configured to function as deformation initiation features when a predetermined force in a longitudinal direction is applied to the first ends. This initiates deformation of the attached members in progressive stages including an initial deformation stage from the first ends to an aligned pair of apertures nearest the first ends, and a subsequent deformation stage from an aligned pair of apertures to the second ends. By selecting the size, location, and spacing of the apertures, the energy absorbing ability and the deformation mode of the energy absorber device can be tuned as desired. In one embodiment in which the energy absorber device is attached to an engine cradle, the energy absorber device is tuned so that complete deformation of the energy absorber device occurs at the engine cradle load capacity.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 3 is a schematic perspective view of an upper member of the energy absorber device of FIG. 1.

FIG. 4 is a schematic perspective view of a lower member of the energy absorber device of FIG. 1.

DETAILED DESCRIPTION

Figure 1:
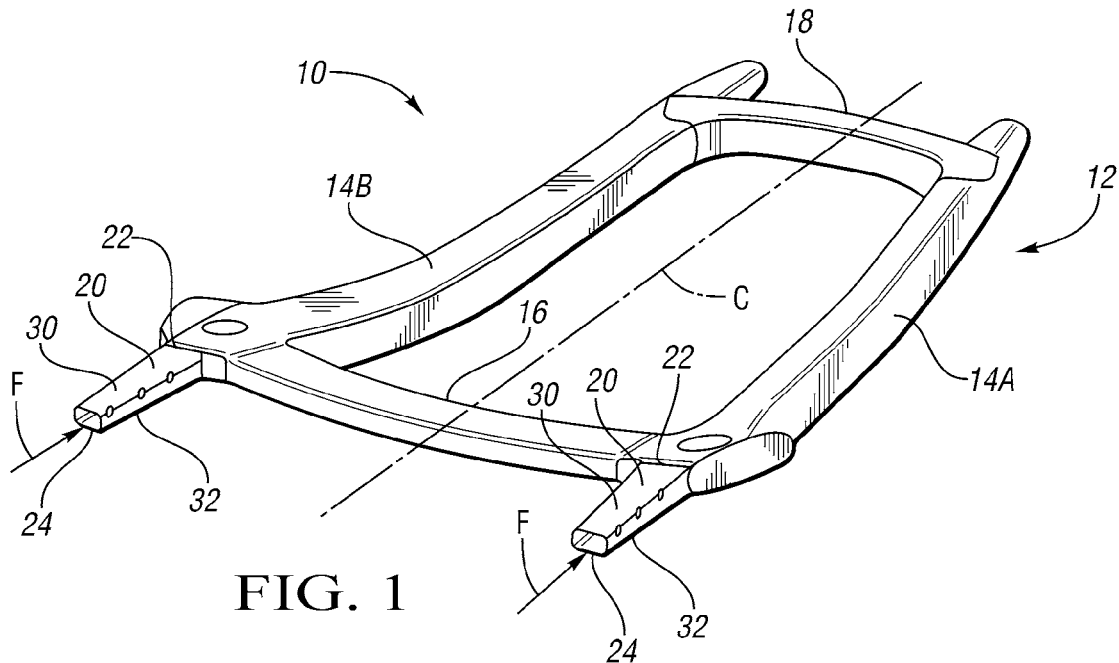
FIG. 1 is a schematic perspective illustration of a portion of a vehicle having a front cradle assembly with energy absorber devices of a first embodiment attached thereto.

Referring to the drawings, wherein like reference numbers refer to like components throughout the views, FIG. 1 shows a portion of a vehicle 10 that includes a front engine cradle assembly 12, also referred to herein as a support cradle, a cradle, or a component of the vehicle 10. The cradle 12 has two generally parallel longitudinal side rails 14A, 14B. A front cross member 16 attaches to the side rails 14A, 14B near the front of the side rails 14A, 14B. A rear cross member 18 attaches to the side rails 14A, 14B near the rear of the side rails 14A, 14B. The side rails 14A, 14B extend generally fore and aft (i.e., longitudinally) in the vehicle 10.

Two identical energy absorber devices 20 are attached to the cradle 12 generally in alignment with the side rails 14A, 14B. Each of the energy absorber devices 20 extends forward of the cradle 12 from a proximate end 22 to a distal end 24 to effectively extend the overall length of the cradle 12. The energy absorber devices 20 are also referred to herein as cradle extension assemblies. As further described herein, the energy absorber devices 20 are configured to absorb energy resulting from an impulse experienced by the vehicle, and include deformation initiation features that enable energy management. In one non-limiting example, the energy absorber devices 20 can be tuned so that a final deformation state (represented in FIG. 8) of the energy absorber devices 20 is achieved when a force F of a predetermined magnitude is applied in a longitudinal direction at distal ends 24 of each of the energy absorber devices 20, and the force F is equal to a predetermined buckling load of the engine cradle assembly 12. The force F may, for example, have an external origin relative to the vehicle 10 and be part of the impulse experienced by the vehicle. The longitudinal direction of the force F is generally parallel with the centerline C of the vehicle 10, and in a rearward direction. Although the energy absorber devices 20 are shown attached to the front cradle assembly 12 for managing energy at the front of the vehicle 10, the energy absorber devices 20 could alternatively be positioned elsewhere on the front cradle assembly 12 or on the vehicle 10 to manage energy at the rear or at the sides of the vehicle 10.

Figure 2:
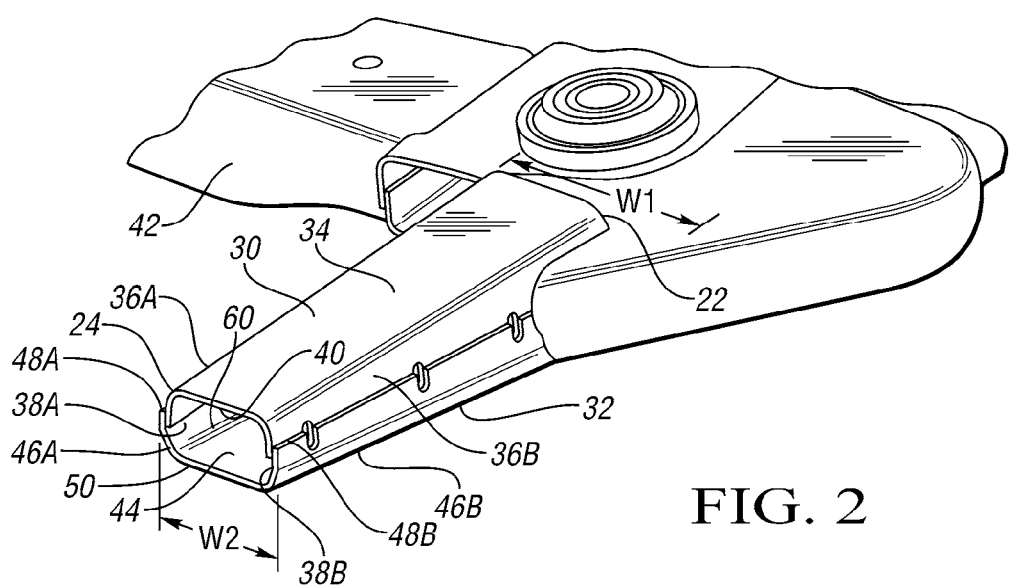
FIG. 2 is a schematic perspective illustration in fragmentary view of one of the energy absorber devices of FIG. 1 attached to the front cradle assembly.

As best shown in FIGS. 2-4, the energy absorber device 20 has a first elongated member 30 and a second elongated member 32, which are also referred to herein as an upper member and a lower member, respectively. In FIG. 1, the upper member 30 is welded to the lower member 32 at various locations along side walls of the members 30, 32, and the entire energy absorber device 20 is welded to the cradle 12. As is evident in FIGS. 2 and 5, the energy absorber device 20 tapers in height from H1 to H2, and in width from W1 to W2, generally from the proximate end 22 to the distal end 24. This enables the energy absorber device 20 to collapse into itself generally in the direction of the longitudinal force F when deforming, as described herein with respect to FIGS. 5-8, thereby preventing bending and twisting about a longitudinal axis through the energy absorber device 20.

FIG. 3 shows that the first member 30 has a base 34 with first and second side walls 36A, 36B extending generally perpendicular to the base 34 and each terminating at a respective terminal edge 38A, 38B that extends from a first end 40 to a second end 42 of the first member 30. The first member 30 is thus generally U-shaped in a cross section along the base 34. The first member 30 has a rear wall 43 at the second end 42 that acts as a cradle interface and as a base against which deformation can occur when interfacing with a barrier such as the engine cradle 12.

Figure 5:
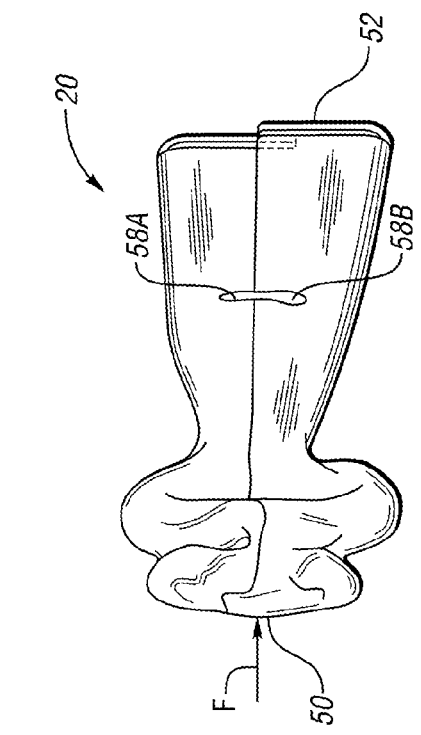
FIG. 5 is a schematic illustration in side view of the energy absorber device of FIG. 1 attached to the front cradle assembly in an undeformed state.
Figure 8:
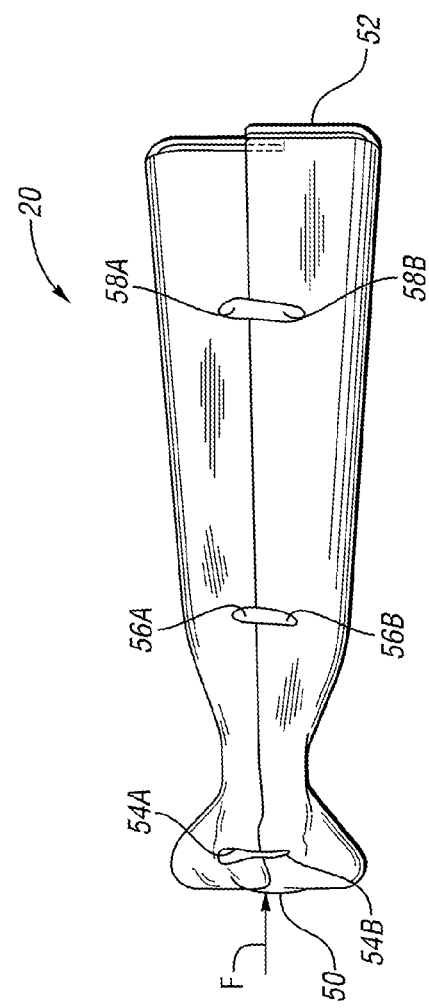
FIG. 8 is a schematic illustration in side view of the energy absorber device of FIG. 5 in a third buckling mode after a third stage of deformation.

The second member 32 has a base 44 with first and second side walls 46A, 46B extending generally perpendicular to the base 44 and terminating at terminal edges 48A, 48B that extend substantially from a first end 50 to a second end 52 of the second member 32. The second member 32 is thus generally U-shaped in a cross section along the base 44. The second member 32 has a rear wall 53 that acts as a base against which deformation can occur when the rear wall 53 interfaces with a barrier such as the engine cradle 12. As indicated in FIGS. 5 and 8, when the first member 30 is attached to the second member 32, the rear wall 43 is positioned adjacent to and forward of the rear wall 53, with the rear walls 43 and 53 overlapping one another. A portion of the rear wall 43 that overlaps with the rear wall 53 is shown with hidden lines. Because the energy absorber device 20 has rear walls 43, 53, these will allow deformation in a desired manner even though the cradle 12 does not have a wall portion against the rear walls 43, 53. That is, the cradle 12 is an open cradle.

The first member 30 has a first pair of apertures 54A that are at least partially defined by the side walls 36A, 36B. The apertures 54A, 54B interrupt the terminal edges 38A, 38B. The apertures 54A, 54B are laterally aligned with one another along a length of the first member 30. Additional pairs of apertures 56A, 58A are spaced along the side walls 36A, 36B and interrupt the terminal edges 38A, 38B. The apertures 56A are referred to as a third pair of aligned apertures. The apertures 58A are referred to as a fifth pair of aligned apertures.

Similarly, the second member 32 has a second pair of apertures 54B that are at least partially defined by the side walls 46A, 46B. The apertures 54B interrupt the terminal edges 48A, 48B. Additional pairs of apertures 56B, 58B are spaced along the side walls 46A, 46B and interrupt the terminal edges 48A, 48B. The apertures 56B are referred to as a fourth pair of aligned apertures. The apertures 58B are referred to as a sixth pair of aligned apertures.

The upper member 30 and the lower member 32 can each be stamped from a steel sheet. The apertures 54A, 56A, 58A, 54B, 56B, 58B can be blanked from the sheets prior to bending the side walls 36A, 36B, 46A, 46B. Location of the apertures at the terminal edges 38A, 38B, 48A, 48B enables precise control of the shape and size of the apertures, because their position at the edges 38A, 38B, 48A, 48B will be undistorted by any subsequent die operations.

The first member 30 is welded to the second member 32 at various locations along the side walls 36A, 36B, 38A, 38B, with the side walls 38A, 38B of the second member 32 overlapping the side walls 36A, 36B of the first member 30. The second member 32 is slightly wider than the first member 30 so that the walls 46A, 46B are outward of the walls 36A, 36B. The first base 34 and the second base 44 are positioned opposite one another such that a cavity 60 is formed between the attached members 30, 32, as shown in FIG. 2. When attached in this manner, the first pair of apertures 54A aligns with the second pair of apertures 54B. The apertures 56A align with apertures 56B, and the apertures 58A align with apertures 58B.

Figure 6:
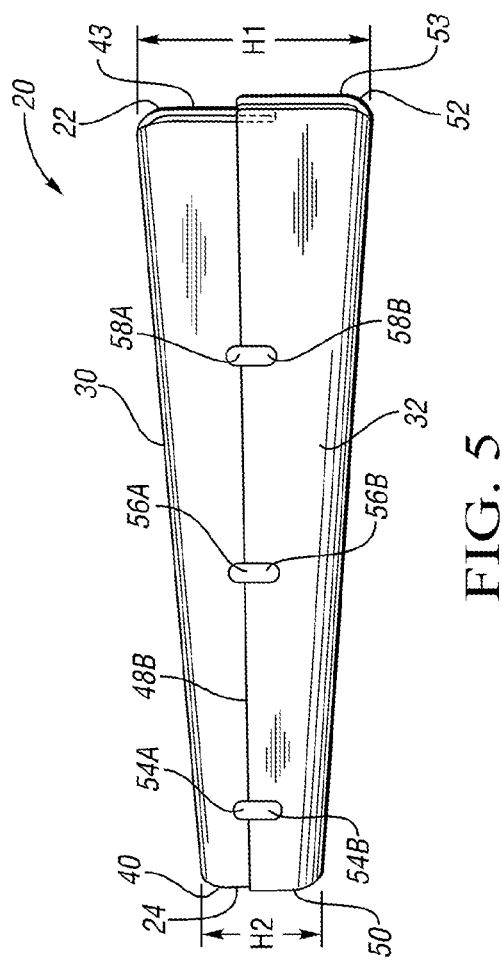
FIG. 6 is a schematic illustration in side view of the energy absorber device of FIG. 5 in a first buckling mode after a first stage of deformation.
Figure 7:
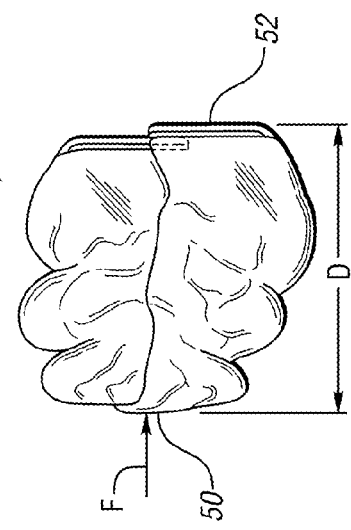
FIG. 7 is a schematic illustration in side view of the energy absorber device of FIG. 5 in a second buckling mode after a second stage of deformation.

The apertures 54A, 56A, 58A, 54B, 56B, 58B are configured to function as deformation initiation features when a predetermined force F in the longitudinal direction is applied to the first ends 40, 50 (i.e., to the distal end 24 of the device 20), thereby initiating deformation of the attached members 30, 32 in progressive stages as illustrated in FIGS. 6-8. An initial deformation stage shown in FIG. 6 occurs from the first ends 40, 50 generally to an area between the forward-most apertures 54A, 54B and the apertures 56A, 56B, with the apertures 54A, 54B serving as weak areas to initiate deformation. An intermediate deformation stage then occurs to an area beyond the apertures 58A, 58B with the apertures 56A, 56B initiating deformation. A subsequent deformation stage from the apertures 58A, 58B to the second ends 42, 52 with the apertures 58A, 58B initiating deformation. Because material of the members 30, 32 is removed at the apertures, stress concentrations occur in the members 30, 32 immediately surrounding the apertures. FIG. 5 shows the energy absorber device 20 in an undeformed state, just prior to application of force F. FIG. 6 shows the energy absorber device 20 after a first state of deformation, in what is referred to as a first buckling mode. The material from the distal end 24 to slightly beyond the first set of apertures 54A, 54B will buckle in the direction of the longitudinal force F. The energy absorber device 20 will deform inward upon itself without significant bending along a longitudinal axis and without significant twisting.

When the energy absorber device 20 reaches the first buckling mode of FIG. 6, if the energy of the force F is greater than that absorbed by the deformation, then the energy absorber device 20 will continue to buckle to a second state of deformation, referred to as a second buckling mode shown in FIG. 7. The material has buckled to beyond the apertures 56A, 56B. If continued energy absorption is needed to absorb the energy of the force F, the energy absorber device 20 will continue to buckle to a final buckling mode having a final deformed shape shown in FIG. 8. In the final buckling mode, the energy absorber device 20 is completely collapsed and will absorb no further energy. Further absorption of energy would then be accomplished by the cradle 12. For maximum energy absorption, the energy absorber device 20 is configured to reach the final buckling mode when the magnitude of the predetermined force F is equal to a predetermined buckling load of the cradle 12.

The size of the apertures 54A, 56A, 58A, 54B, 56B, 58B and their spacing affects the energy absorbed in each stage of deformation. Larger apertures will generally lower the strength of the device 20 and cause the deformation of the material around the aperture to occur more easily. Additionally, if subsequent sets of apertures are further from one another, greater energy is absorbed in deforming the material between the sets of apertures. In this manner, by selecting the material, length, width, and thickness of the energy absorber device 20, as well as by selecting the number, size, and spacing of the apertures, the energy absorber device 20 is tuned, such as to achieve a buckling mode progression in which the energy absorbed at the final deformed shape (FIG. 8) is that at which the cradle 12 (or other component to which the energy absorber device 20 is attached) will begin to buckle. At the final deformation stage of FIG. 8, there is a minimum distance D between the first end 50 and the second end 52.

Figure 9:
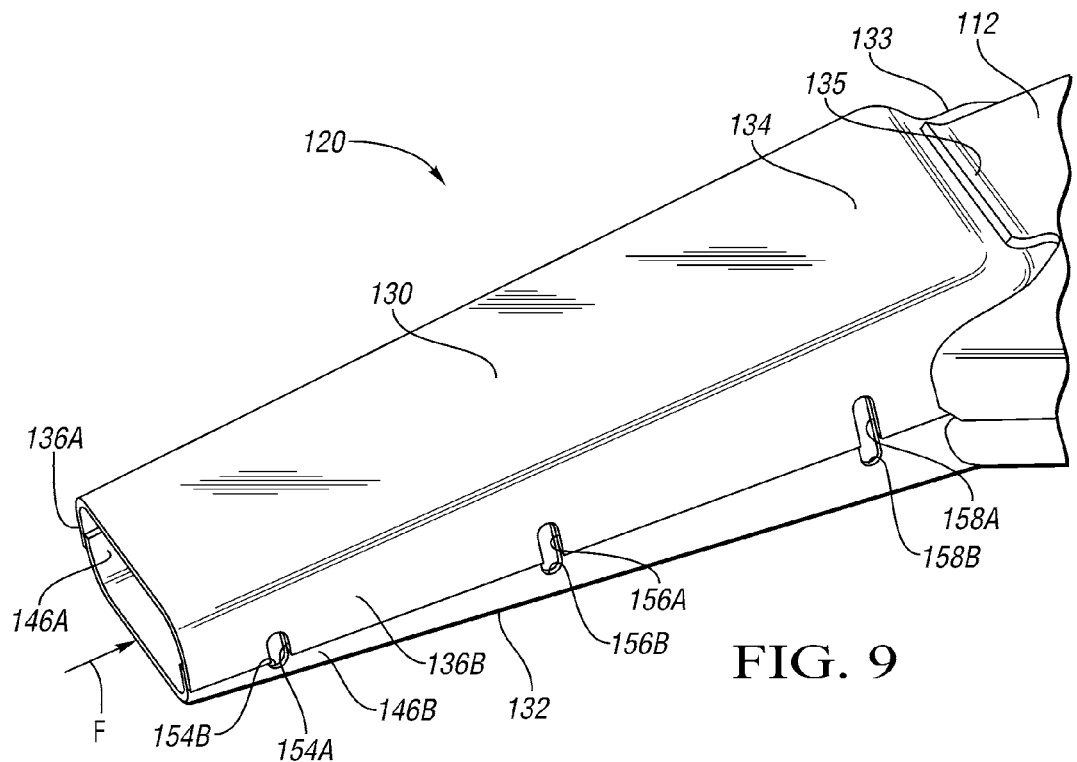
FIG. 9 is a schematic illustration in fragmentary perspective view of a second embodiment of an energy absorber device attached to the front cradle assembly, in accordance with an alternative aspect of the present teachings.

FIG. 9 shows another embodiment of an energy absorber device 120 attached to a portion of a cradle 112 and configured to absorb energy by buckling in a controlled manner due to spaced, aligned apertures in a first (upper) member 130 and in a second (lower) member 132. The apertures 154A, 156A, 158A of the first member 130 align with the apertures 154B, 156B, 158B of the second member 132, and are positioned at terminal edges of side walls 136A, 136B, 146A, 146B. Because of the alignment of aperture 154A with aperture 154B, aperture 156A with aperture 156B, and aperture 158A with 158B, the first member 130 and the second member 132 form spaced slots when the first member 130 is connected to the second member 132. The first member 130 and second member 132 have identical apertures (not shown) in the side walls 136A, 146A.

Rear portions of the first and second members 130, 132 that interface with the cradle 112 are configured in an alternative manner than members 20, 32 of FIGS. 3 and 4. The base 134 of the first member 130 declines toward the cradle 112 to provide a ramped interface area 133 that is welded to a mating ramped portion 135 of the cradle 112. An identical ramped interface area of the second member 132 is welded to and interfaces with an identical ramped portion of the cradle 112. When the force F acts to deform the energy absorber device 120, the interface area 133 can react against the ramped portion 135 of the cradle 112 and be held relatively stationary with respect to the cradle 112 so that deformation will occur in a progressive buckling mode as described in FIGS. 5-8.

Figure 10:
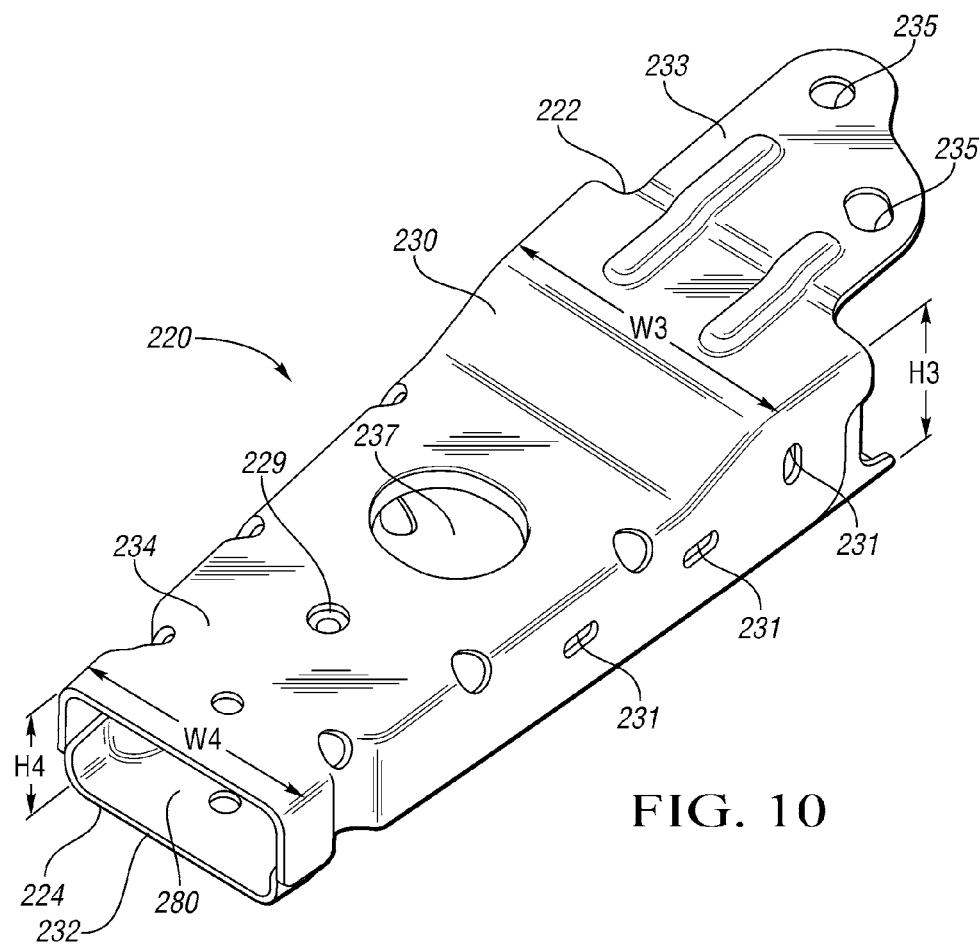
FIG. 10 is a schematic illustration in perspective view of a third embodiment of an energy absorber device for attachment to the front cradle assembly of FIG. 1, in accordance with an alternative aspect of the present teachings.
Figure 11:
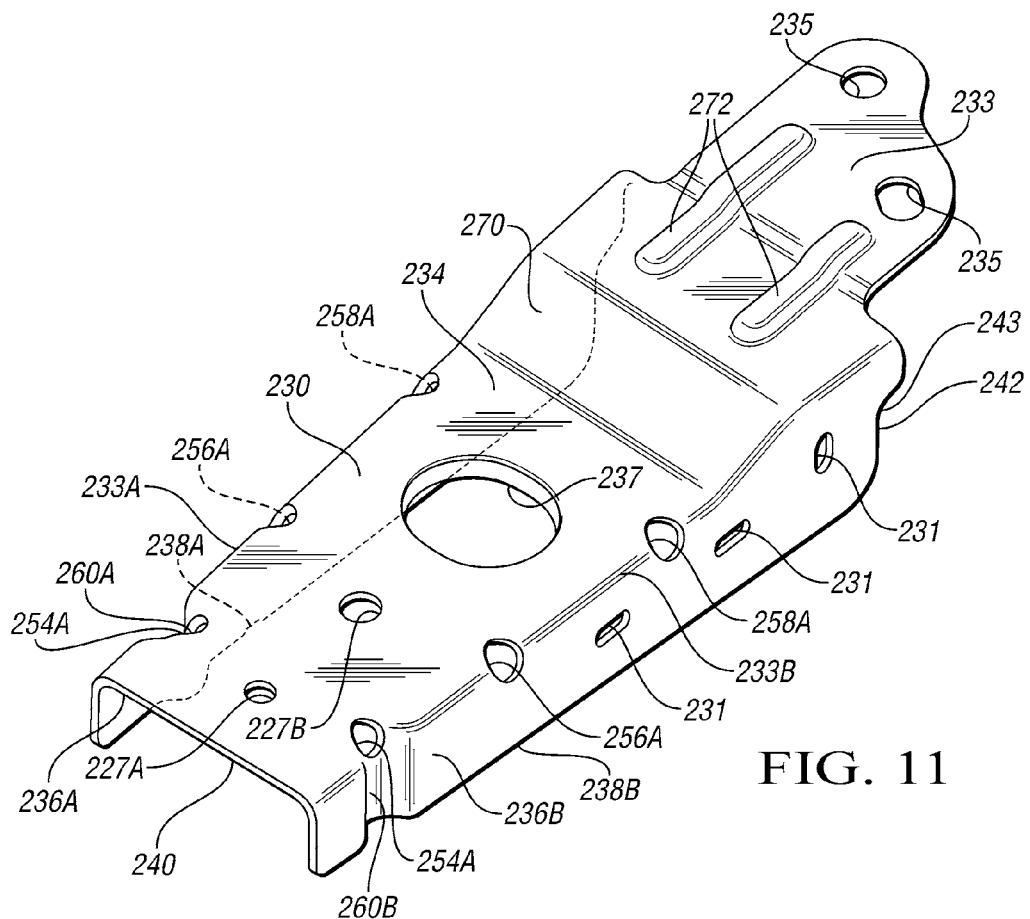
FIG. 11 is a schematic illustration in perspective view of a first member of the energy absorber device of FIG. 10.
Figure 12:
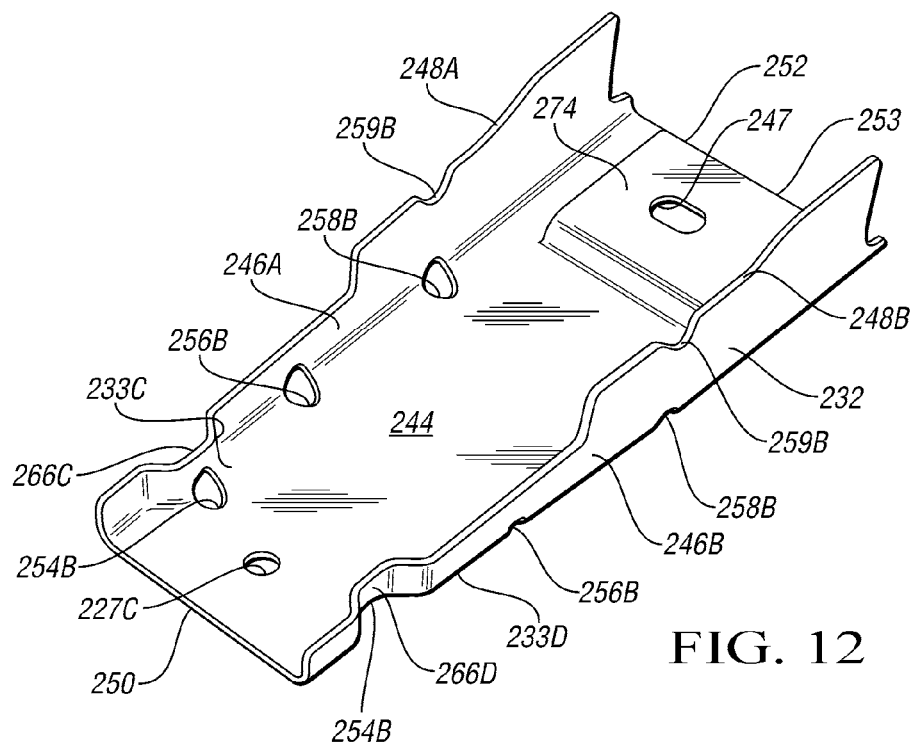
FIG. 12 is a schematic illustration in perspective view of a second member of the energy absorber device of FIG. 10.

FIGS. 10-12 show another embodiment of an energy absorber device 220 that can be used in place of the energy absorber device 20 of FIG. 1. Two identical energy absorber devices 220 can be attached to the cradle 12 of FIG. 1 in alignment with the side rails 14A, 14B. Each of the energy absorber devices 220 extend forward of the cradle 12 from a proximate end 222 to a distal end 224 to effectively extend the overall length of the cradle 12, and are also referred to herein as cradle extension assemblies.

The energy absorber device 220 has a first member 230 and a second member 232, also referred to as an upper member and a lower member, respectively. As further described herein, the energy absorber devices 220 are configured to absorb energy, and include deformation initiation features that enable energy management. In one non-limiting example, the energy absorber devices 220 can be tuned to achieve a final deformation state (similar to that of FIG. 8) when a force F of a predetermined magnitude applied in a longitudinal direction at distal ends 224 of two energy absorber devices 220 attached to the cradle 12 is equal to a predetermined buckling load of the cradle 12. The longitudinal direction of the force F is parallel with the centerline C of the vehicle 10 (shown in FIG. 1), and in a rearward direction. Although the energy absorber devices 220 are discussed herein as being attached to a front cradle assembly similar to cradle 12 for managing energy at the front of the vehicle 10, the energy absorber devices 220 could alternatively be positioned on the vehicle 10 to manage energy at the rear or at the sides of the vehicle 10.

The energy absorber device 220 has a first elongated member 230 and a second elongated member 232, which are also referred to herein as an upper member and a lower member, respectively. The upper member 230 is welded to the lower member 232 and the entire energy absorber device 220 is welded to an engine cradle. The engine cradle would be designed to have a wall portion generally perpendicular to the base portion 234, 244 to serve as a reaction base against which the energy absorber device 20 can deform. The first member 230 is welded to the second member 232 at weld openings 231 configured to receive weld material during puddle welding. The opposite side wall 236A has identical weld openings. The first member 230 has an attachment flange 233 with fastener openings 235 configured to receive bolts that align with fastener openings in an engine cradle to attach the energy absorber device 220 to the engine cradle.

As is evident in FIG. 10, the energy absorber device 220 tapers in height from H3 to H4, and in width from W3 to W4, generally from the proximate end 222 to the distal end 224. This enables the energy absorber device 220 to collapse into itself generally in the direction of the longitudinal force F when deforming, as described herein, thereby preventing bending and twisting about a longitudinal axis.

Referring to FIG. 11, the first member 230 has a first base 234 with first and second side walls 236A, 236B, each extending from the base 234 and generally perpendicular to the base 234. Each of the sidewalls 236A, 236B terminates at a respective terminal edge 238A, 238B that extends from a first end 240 to a second end 242 of the first member 230. The first member 230 is thus generally U-shaped in a cross section along the base 234. The first member 230 has a rear edge 243 that interfaces with the cradle 12 of FIG. 1 during deformation.

Referring to FIG. 12, the second member 232 has a second base 244 with first and second side walls 246A, 246B, each extending from the base 244 and generally perpendicular to the base 244. Each of the side walls 246A, 246B terminates at a respective terminal edge 248A, 248B that extends from a first end 250 to a second end 252 of the second member 232. The second member 232 is thus generally U-shaped in a cross section along the base 244. The second member 232 has a rear edge 253 that interfaces with the cradle 12 of FIG. 1 during deformation.

The first member 230 has a first bend 233A that transitions from the first base 234 to the first side wall 236A, and a second bend 233B that transitions from the first base 234 to the second side wall 236B. A first pair of apertures 254A is positioned on the first and second bends 233A, 233B and is at least partially defined by the side walls 236A, 236B. The apertures 254A are substantially laterally aligned with one another along a length of the first member 230. Additional pairs of apertures 256A, 258A are positioned on the bends 233A, 233B and spaced along the side walls 236A, 236B. The apertures 256A are referred to as a third pair of aligned apertures. The apertures 258A are referred to as a fifth pair of aligned apertures. The first member 230 is formed with a narrowed neck created by aligned, inwardly jutting valleys 260A, 260B in the side walls 236A, 236B. Openings 227A, 227B are formed in the base 234 for attachment to another component, such as a baffle of a coolant/radiator/fan module (not shown). FIG. 10 shows a Christmas tree fastener 229 in opening 227B for attachment to the module. A larger opening 237 is formed in the base 234 and is configured to receive a support for the module.

Similarly, the second member 232 has a third bend 233C that transitions from the second base 244 to a first side wall 246A, and a fourth bend 233D that transitions from the second base 244 to the second side wall 246B. A second pair of apertures 254B is positioned on the third and fourth bends 233C, 233D and is at least partially defined by the side walls 246A, 246B. The apertures 254B are substantially laterally aligned with one another along a length of the second member 232. Additional pairs of apertures 256B, 258B are positioned on the bends 233C, 233D and spaced along the side walls 246A, 246B. The apertures 256B are referred to as a fourth pair of aligned apertures. The apertures 258B are referred to as a sixth pair of aligned apertures. An additional pair of aligned apertures 259B is formed to interrupt terminals edges 248A, 248B of the side walls 246A, 246B. The second member 230 is formed with a narrowed neck created by aligned, inwardly jutting valleys 260C, 260D in the side walls 246A, 246B. The base 244 has a rear slot 247 that receives a fastener to attach the second member 232 to a cradle such as cradle 12 of FIG. 1. An opening 227C receives the cooling/fan/radiator module.

The upper member 230 and the lower member 232 can each be initially stamped from a steel sheet. The stamped members are then placed in a series of dies to create the bends, 233A, 233B, 233C, 233D, the valleys 260A, 260B, 266C, 266D forming the narrowed necks, a raised portion 270 of the base 234, ribs 272 near the flange 233 and a mounting platform 274. The apertures 254A, 256A, 258A, 254B, 256B, 258B can be punched in the sheets during the die formation process.

The first member 230 is welded to the second member 232 with the side walls 236A, 236B of the first member 230 overlapping the side walls 238A, 238B of the second member 232 as shown in FIG. 10. In this embodiment, the upper member 230 is slightly wider than the lower member 232, so the side walls 236A, 236B are positioned outward of the side walls 238A, 238B. The first base 234 and the second base 244 are positioned opposite one another such that a cavity 280 is formed between the attached members 230, 232, as shown in FIG. 10. When attached in this manner, the first pair of apertures 254A laterally aligns with the second pair of apertures 254B. Apertures 256A laterally align with apertures 256B, and apertures 258A laterally align with apertures 258B. The apertures 254A, 254B laterally align with one another in that they are positioned at substantially the same location along the length of the device 220. The apertures 254A, 254B, 256A, 256B, 258A, 258B do not overlap as do the pairs of apertures of the devices 20 and 120. Apertures 259B overlap with apertures 258A, similar to the alignment of the apertures 54A, 54B; 154A, 154B of devices 20 and 120.

The apertures 254A, 254B, 256A, 256B, 258A, 258B, 259B as well as the narrowed neck portions (i.e., the valleys 260A, 260B, 266C, 266D) are configured to function as deformation initiation features when a predetermined force F in the longitudinal direction is applied to the first ends 240, 250 (i.e., to the distal end 224 of the device 220), thereby initiating deformation of the attached members 230, 232 in progressive stages similar to that illustrated with respect to device 20 in FIGS. 6-8. An initial deformation stage occurs from the first ends 240, 250 to slightly beyond the aligned pairs of apertures 254A, 254B, and subsequent deformation stages occur from apertures 254A, 254B to slightly beyond apertures 256A, 256B, then from apertures 256A, 256B to slightly beyond apertures 258A, 258B, and finally from apertures 258A, 258B to the second ends 242, 252. Because material of the members 230, 232 is removed at the apertures, stress concentrations occur in the members 230, 232 immediately surrounding the apertures. The neck portions at the valleys 260A, 260B, 266C, 266D also create a stress concentration.

Accordingly, a method of manufacturing an energy absorber device for a vehicle cradle assembly includes creating apertures at least partially in side walls of a first elongated member, and creating apertures at least partially in side walls of a second elongated member. For example, apertures 54A, 56A, 58A are created in first elongated member 30, and apertures 54B, 56B, 58B are created in second elongated member 32. Apertures 154A, 156A, 158A are created in elongated first member 130, and apertures 154B, 156B, 158B are created in elongated second member 132. Apertures 254A, 256A, 258A are created in elongated first member 230, and apertures 254B, 256B, 258B are created in elongated second member 232.

Creating apertures at least partially in side walls of the first elongated member may include blanking the apertures in the first elongated member, and then bending the first elongated member to form the sidewalls. For example, apertures 54A, 56A, 58A, 54B, 56B, 58B located along terminal edges 38A, 38B, 48A, 48B of the elongated first and second members 30, 32 can be blanked prior to bending, as the apertures are remote from the bends between the base 34, 44 and the side walls 36A, 36B, 46A, 46B of each elongated member 30, 32, and the bending will therefore not distort the apertures 54A, 56A, 58A, 54B, 56B, 58B. Apertures 154A, 156A, 158A, 154B, 156B, 158B of elongated members 130, 132 can also be blanked prior to bending due to their location at the terminal edges of the elongated members 130, 132.

Alternatively, creating apertures at least partially in side walls of the first elongated member may be by die-forming the first elongated member and then punching the apertures in the die-formed first elongated member. For example, the first elongated member 230 and the second elongated member 232 can be die-formed, and then the apertures 254A, 254B, 256A, 265B, 258A, 258B can be punched at the bends 233A, 233B, 233C, 233D.

The method then includes attaching the first elongated member to the second elongated member so that the side walls of the first elongated member at least partially overlap the side walls of the second elongated member, and the apertures of the first elongated member at least partially align with the apertures of the second elongated member. Each of the energy absorber devices 20, 120, 220 has elongated members 30, 32, 130, 132, 230, 232, respectively, with side walls that overlap one another. Attaching the first elongated member to the second elongated member may be by welding, such as is described with respect to energy absorber device 220 showing weld openings where weld material can be added to attach the first and second members 230, 232 to one another. The first and second members 30, 32 and 130, 132 can also be welded to one another at any suitable location along their length.

The method may also include forming fastener openings in at least one of the first elongated member and the second elongated member that are configured to be alignable with fastener openings of the vehicle cradle assembly to enable attachment of the energy absorber device to the vehicle cradle assembly at the aligned fastener openings. For example, fastener openings 235 formed in the first elongated member 230 are attachable to aligned fastener openings in a vehicle cradle assembly. Alternatively, the elongated members could be welded to the cradle assembly. For example, the first ramped interface area 133 of the first elongated member 130 can be welded to the ramped portion 135 of the cradle assembly 112.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An energy-absorber device mountable to a component of a vehicle, the device comprising:
   an elongated first member;
   an elongated second member; wherein each of the elongated first member and the elongated second member has a base with a first end and a second end, has opposing first and second side walls extending from the base between the first end and the second end, and has a rear wall extending from the base at the second end;
   wherein the elongated first member has a first pair of apertures at least partially defined by and extending through the first and second side walls of the elongated first member;
   wherein the elongated second member has a second pair of apertures at least partially defined by and extending through first and second side walls of the elongated second member;
   wherein the elongated first member is attached to the elongated second member with the side walls of the elongated first member at least partially overlapping the side walls of the elongated second member, the rear wall of the elongated first member positioned forward of and overlapping the rear wall of the elongated second member, and the base of the elongated first member positioned opposite to the base of the elongated second member so that the elongated first member and the elongated second member define a cavity between the attached elongated first and second members, and such that the first pair of apertures is at least partially aligned with the second pair of apertures;
   wherein the aligned pairs of apertures are configured to function as deformation initiation features at which the elongated first member and the elongated second member deform under a predetermined force in a longitudinal direction applied to the first end of the elongated first member and to the first end of the elongated second member.

2. The energy absorber device of claim 1, wherein the second end of the elongated first member is wider than the first end of the elongated first member, and the second end of the elongated second member is wider than the first end of the elongated second member.

3. The energy absorber device of claim 1, wherein the elongated first member has a third pair of apertures at least partially defined by and extending through the first and second side walls of the elongated first member, and positioned between the first pair of apertures and the second end of the elongated first member;
   wherein the elongated second member has a fourth pair of apertures at least partially defined by and extending through the first and second side walls of the elongated second member, and positioned between the second pair of apertures and the second end of the elongated second member;
   wherein the third and fourth pairs of apertures at least partially align with one another and are configured to function as deformation initiation features under the predetermined force so that a deformation stage of the elongated first and second members occurs with deformation between the first and second pairs of apertures and the third and fourth pairs of apertures after the initial deformation stage, and before a deformation stage from the third and fourth pairs of apertures to the second ends.

4. The energy absorber device of claim 1 in combination with the component of the vehicle, wherein the component of the vehicle is an engine cradle assembly that has a predetermined buckling load; and wherein the elongated first and second members and the first and second pairs of apertures are configured so that a deformation load necessary to deform the elongated first and second members from the first ends to the second ends is substantially equal to the predetermined buckling load.

5. A vehicle comprising:
   a support cradle having longitudinal side rails, and having a cross member attached to both of the longitudinal side rails; wherein the support cradle has a ramped portion;
   a cradle extension assembly operatively connected to the support cradle at a proximate end of the cradle extension assembly, and positioned to extend longitudinally outward from the support cradle to a distal end;
   wherein the cradle extension assembly has an elongated first member and an elongated second member; wherein the elongated first member is attached to the elongated second member such that a cavity is formed between the elongated first member and the elongated second member;
   wherein the elongated first member and the elongated second member each have a base and side walls extending from the base and having apertures; wherein the base has a ramped interface area connected to the ramped portion of the support cradle; wherein the side walls of the elongated first member overlap the side walls of the elongated second member so that the apertures of the side walls of the elongated first member at least partially align with the apertures of the side walls of the elongated second member;
   wherein the attached elongated first and second members are configured to deform from the distal end to the aligned apertures nearest the distal end, and subsequently deform from the aligned apertures to the proximate end under a force in a longitudinal direction applied to the distal end.

6. The vehicle of claim 5, wherein the cradle extension assembly is configured to achieve a complete deformation with a minimum distance between the distal end and the proximate end if the force has a predetermined magnitude substantially equal to the magnitude of a buckling load of the support cradle assembly.

7. The vehicle of claim 5, wherein the cradle extension assembly tapers from the proximate end to the distal end.

8. The vehicle of claim 5, wherein the elongated first member and the elongated second member each have a base;

wherein the elongated first member has a first bend that transitions between the base of the elongated first member and a first one of the side walls of the elongated first member, and has a second bend that transitions between the base of the elongated first member and a second one of the side walls of the elongated first member;

wherein the elongated second member has a third bend that transitions between the base of the elongated second member and a first one of the side walls of the elongated second member, and has a fourth bend that transitions between the base of the elongated second member and a second one of the side walls of the elongated second member;

wherein a first pair of the apertures is positioned at the first and second bends; and wherein a second pair of the apertures is positioned at the third and fourth bends.

9. The vehicle of claim 8, wherein each of the apertures of the first pair of apertures and of the second pair of apertures is generally circular.

10. The vehicle of claim 5, wherein the side walls of the elongated first member each have a terminal edge extending longitudinally between the distal end and the proximate end; wherein each aperture of the first pair of apertures is a slot that interrupts a respective one of the terminal edges of the side walls of the elongated first member; and wherein each aperture of the second pair of apertures is a slot that interrupts a respective one of the terminal edges of the side walls of the elongated second member.

11. A method of manufacturing an energy absorber device for a vehicle cradle assembly, the method comprising:

creating apertures at least partially in side walls of a first elongated member;

creating apertures at least partially in side walls of a second elongated member;

attaching the first elongated member to the second elongated member so that the side walls of the first elongated member at least partially overlap the side walls of the second elongated member, the apertures of the first elongated member at least partially align with the apertures of the second elongated member, and a rear wall of the first elongated member is forward of and at least partially overlaps a rear wall of the second elongated member.

12. The method of claim 11, wherein said creating apertures at least partially in side walls of the first elongated member includes blanking the apertures in the first elongated member; and bending the first elongated member to form the side walls.

13. The method of claim 11, wherein said creating apertures at least partially in side walls of the first elongated member is by die-forming the first elongated member; and punching the apertures in the die-formed first elongated member.

14. The method of claim 11, wherein said attaching the first elongated member to the second elongated member is by welding.

* * * * *